(12) United States Patent
Furch et al.

(10) Patent No.: US 12,438,706 B2
(45) Date of Patent: Oct. 7, 2025

(54) METHOD AND SYSTEM FOR ONBOARDING AN IoT DEVICE

(71) Applicant: Siemens Aktiengesellschaft, Munich (DE)

(72) Inventors: Andreas Furch, Freising (DE); Hans Aschauer, Munich (DE); Fabrizio De Santis, Munich (DE); Rainer Falk, Poing (DE); Malek Safieh, Bayern (DE); Daniel Schneider, Munich (DE); Florian Wilde, Munich (DE); Thomas Zeschg, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 393 days.

(21) Appl. No.: 18/191,432

(22) Filed: Mar. 28, 2023

(65) Prior Publication Data
US 2023/0308266 A1   Sep. 28, 2023

(30) Foreign Application Priority Data
Mar. 28, 2022   (EP) .................................. 22164764

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 9/40* | (2022.01) | |

(52) U.S. Cl.
CPC .......... *H04L 9/0852* (2013.01); *H04L 9/3215* (2013.01); *H04L 9/3265* (2013.01); *H04L 9/3268* (2013.01); *H04L 63/0823* (2013.01)

(58) Field of Classification Search
None
See application file for complete search history.

(56) References Cited

U.S. PATENT DOCUMENTS

| 11,128,612 B1* | 9/2021 | Loladia ................. H04W 12/71 |
| 11,570,009 B1* | 1/2023 | Mallipeddu ............. H04L 67/12 |
| 2018/0054490 A1* | 2/2018 | Wadhwa ............... G08G 1/0129 |
| 2019/0313246 A1* | 10/2019 | Nix ...................... H04W 12/069 |

(Continued)

FOREIGN PATENT DOCUMENTS

| WO | WO-2019089164 A1 * | 5/2019 | ............ H04W 12/50 |

OTHER PUBLICATIONS

Search Report for EP Application No. 22164764.7, 5 pages, Sep. 14, 2022.

(Continued)

*Primary Examiner* — Jeffery L Williams
(74) *Attorney, Agent, or Firm* — Slayden Grubert Beard PLLC

(57) ABSTRACT

Various embodiments of the teachings herein include a method for onboarding an IoT device (3) of a manufacturer, in a manner secure against quantum computer attacks, in an infrastructure of a customer by means of a first server (1) of a manufacturer domain of the manufacturer and a second server (2) of a customer domain of the customer. In some embodiments, three authenticated and encrypted communication channels and a key encapsulation method are used to provide a device certificate of the customer domain for the IoT device on the IoT device.

15 Claims, 2 Drawing Sheets

(56) References Cited

U.S. PATENT DOCUMENTS

| | | | | |
|---|---|---|---|---|
| 2020/0128077 | A1* | 4/2020 | Yu | H04L 69/18 |
| 2020/0236177 | A1* | 7/2020 | Becker | G06F 9/445 |
| 2020/0275273 | A1* | 8/2020 | Smith | H04W 12/50 |
| 2021/0160325 | A1* | 5/2021 | Lee | H04L 63/0823 |
| 2022/0038269 | A1* | 2/2022 | Nix | H04L 9/3093 |
| 2022/0417749 | A1* | 12/2022 | Falk | H04W 12/61 |
| 2023/0049177 | A1* | 2/2023 | Smith | H04L 63/08 |
| 2023/0162551 | A1* | 5/2023 | Baumgarte | G07C 9/27 |
| | | | | 340/5.61 |
| 2023/0308266 | A1* | 9/2023 | Furch | H04L 9/3268 |
| 2023/0353555 | A1* | 11/2023 | Kim | G06F 21/44 |
| 2025/0117444 | A1* | 4/2025 | Daly | G06F 21/10 |
| 2025/0119283 | A1* | 4/2025 | Daly | G06F 21/72 |
| 2025/0181677 | A1* | 6/2025 | Daly | G06F 21/10 |

OTHER PUBLICATIONS https://en.wikipedia.org/wiki/Cryptographic_nonce, Mar. 8, 2023.
Peter Schwabe et al: "More efficient post-quantum KEMTLS with pre-distributed public keys"; IACR; International Association Cryptologic Research; For; Bd. 20220315:092001, Mar. 15, 2022.

* cited by examiner

METHOD AND SYSTEM FOR ONBOARDING AN IoT DEVICE

CROSS-REFERENCE TO RELATED APPLICATIONS

This application claims priority to EP Application No. 22164764.7 filed Mar. 28, 2022, the contents of which are hereby incorporated by reference in their entirety.

TECHNICAL FIELD

The present disclosure relates to the Internet of Things (IoT). Various embodiments of the teachings herein include methods and/or systems for onboarding an IoT device of a manufacturer in an infrastructure of a customer.

BACKGROUND

An example of onboarding for an IoT device in an infrastructure of a customer is zero touch device onboarding. Zero touch device onboarding is an automated process in which credentials (for example X.509 public key certificates) and configuration settings are installed on an IoT device without a service engineer needing to intervene. Such onboarding can also be referred to as provisioning or bootstrapping. A process such as this requires sufficiently strong security features so that only the correct IoT devices are used in a trusted manner in the new domain, i.e. the customer domain. The onboarding process involves communication taking place in particular between three parties:

1. An IoT device on which credentials and configuration settings are being installed;
2. A first server of a manufacturer domain of the manufacturer of the IoT device. The first server can also be referred to as the device authority, is provided by the manufacturer of the IoT device and can firstly serve as guarantor for the authenticity, or originality, of the IoT device and secondly provide the IoT device with trusted information about the customer domain;
3. A second server of a customer domain of the customer, in which the IoT device is intended to be onboarded. The second server can also be referred to as the domain onboarding authority, is operated by the customer of the IoT device and wants to output credentials and/or configuration data for the IoT device, or possesses these.

An IoT device that has not yet performed onboarding connects to the second server, possibly after a discovery procedure, if there is network connectivity, in order to determine the network address of the second server. The second server in turn connects to the first server of the manufacturer domain. Should the originality of the IoT device be checked successfully, the second server provides a device certificate, in particular comprising credentials and configuration settings from the customer domain, for the IoT device, which the IoT device can finally install locally, in particular by resorting to its relationship of trust with the first server in the process. The onboarding process is thus conventionally successfully finished.

Currently, such onboarding processes are carried out on the basis of cryptographically protected connections, for example TLS (Transport Layer Security) or object-oriented security, the confidentiality and integrity of data and the authenticity of the parties involved in the communication being ensured.

In order to check the authenticity of IoT devices against the second server or against the first server, cryptographic signature methods are conventionally used for authentication. The second server or a service available to it usually issues a digital device certificate for the IoT device, which the IoT device can use to authenticate itself by means of a cryptographic signature method after onboarding has taken place.

The security of current asymmetric cryptography used for communication and for checking the authenticity of an IoT device when the IoT device is being onboarded will have a high probability of being open to attack using powerful quantum computers in future.

SUMMARY

There is therefore the need for onboarding for an IoT device that is secure and in particular also efficient against quantum computer attacks. As an example, some embodiments of the teachings herein include a method for onboarding an IoT device (3) of a manufacturer in an infrastructure of a customer by means of a first server (1) of a manufacturer domain of the manufacturer and a second server (2) of a customer domain of the customer, involving: a) setting up (S1) an authenticated and encrypted first communication channel (KK1) between the first server (1) and the second server (2), comprising deriving a session key (K1) that is common to the first server (1) and the second server (2), b) providing (S2) an authenticated and encrypted second communication channel (KK2) between the IoT device (3) and the second server (2), comprising deriving a second session key (K2) that is common to the second server (2) and the IoT device (3), c) setting up (S3) an authenticated and encrypted third communication channel (KK3), which runs via the second server (2), between the IoT device (3) and the first server (1), to which a third key (K3) that is common to the IoT device (3) and the first server (1) is assigned, d) forming (S4) permission information (BI1) by way of the IoT device (3), e) cryptographically protecting (S5) the formed permission information (BI1) by way of the IoT device (3) by means of the third key (K3), f) transmitting (S6) the cryptographically protected permission information (BI2) from the IoT device (3) to the second server (2) via the second communication channel (KK2), g) transmitting (S7) the cryptographically protected permission information (BI2) from the second server (2) to the first server (1) via the first communication channel (KK1), h) decrypting (S8) the cryptographically protected permission information (BI2) transmitted from the second server (2) to the first server (1) by way of the first server (1) by means of the third key (K3), i) encrypting (S9) the decrypted permission information (BI3) by way of the first server (1) by means of the first session key (K1), j) transmitting (S10) the permission information (BI4) encrypted with the first session key (K1) from the first server (1) to the second server (2) via the first communication channel (KK1), k) decrypting (S11) the permission information (BI4) encrypted with the first session key (K1) by way of the second server (2), l) sending (S12) a request (A) to obtain a device certificate (Z6), associated with the IoT device (3), of the customer domain from the second server (2) to a certificate authority (4), m) transmitting (S13) the obtained device certificate (Z6) and the permission information (BI5) decrypted by the second server (2) from the second server (2) to the IoT device (3) via the second communication channel (KK2), and n) accepting (S14) the device certificate (Z6) transmitted by the second server (2) by way of the IoT device (3) if the permission information (BI5) transmitted by the second server (2) matches the formed permission information (BI1).

In some embodiments, the authenticated and encrypted first communication channel (KK1) and/or the authenticated and encrypted second communication channel (KK2) is cryptographically protected by means of a KEM method.

In some embodiments, the KEM method used is KEMTLS.

In some embodiments, the authenticated and encrypted third communication channel (KK3) is rendered as a direct communication channel between the IoT device (3) and the first server (1), or in that the authenticated and encrypted third communication channel (KK3) is rendered as a tunnelled communication channel by tunnelling via the authenticated and encrypted first communication channel (KK1) and the authenticated and encrypted second communication channel (KK2), the second server (2) being used in particular as a forwarding instance in respect of steps f) and g).

In some embodiments, before step a) is performed, the first server (1) is equipped with a root certificate (Z1) of the manufacturer domain, a root certificate (Z2) of the customer domain, a user certificate (Z5) of the manufacturer domain for the first server (1), comprising a public key of the first server (1), and a private key (P1) of the first server (1), before step a) is performed, the second server (2) is equipped with the root certificate (Z1) of the manufacturer domain, the root certificate (Z2) of the customer domain, a user certificate (Z4) of the customer domain for the second server (2), comprising a public key of the second server (2) in the customer domain, and with a private key (P2) of the second server (2), and before step b) is performed, the IoT device (3) is equipped with the root certificate (Z1) of the manufacturer domain, with a user certificate (Z3) of the manufacturer domain for the IoT device (3), comprising a public key of the IoT device (3) in the manufacturer domain, and with a private key (P3) of the IoT device (3).

In some embodiments, the first session key (K1) is known to the first server (1) and the second server (2) and is unknown to the IoT device (3), the second session key (K2) is known to the second server (2) and the IoT device (3) and is unknown to the first server (1), and/or the third session key (K3) is known to the first server (1) and the IoT device (3) and is unknown to the second server (2).

In some embodiments, step d) comprises a random number or a quasi-random number being formed (S4) by the IoT device (3) as permission information (BI1).

In some embodiments, step m) is rendered by transmitting (S13) the obtained device certificate (Z6) together with the permission information (BI5) from the second server (2) to the IoT device (3) via the second communication channel (KK2) within a single session, the permission information (BI5) being transmitted from the second server (2) to the IoT device (3) via the second communication channel (KK2) preferably as part of a certificate extension of the device certificate (Z6).

In some embodiments, the cryptographically protected permission information (BI2) transmitted in steps f) and g) is rendered as a KEM-protected protocol message.

In some embodiments, the authenticated and encrypted second communication channel (KK2) is terminated or invalidated after step m).

In some embodiments, the IoT device (3) takes the formed permission information (BI1) as a basis for permitting only precisely one set of configuration data comprising the device certificate (Z6) to be loaded.

In some embodiments, the first server (1), the second server (2) and the IoT device (3) are each equipped with a KEM-based protocol stack, the KEM-based protocol stack of the IoT device (3) preferably additionally being equipped with suitability for Provisional Accept, the KEM-based protocol stack preferably being set up to implement KEMTLS or KEMTLS-PDK.

In some embodiments, step c) is rendered by setting up the authenticated and encrypted third communication channel (KK3), which runs via the second server (2), between the IoT device (3) and the first server (1), comprising deriving a third session key (K3) that is common to the IoT device (3) and the first server (1).

In some embodiments, before step c) is performed, a device-individual PIN is securely stored in each of the first server (1) and the IoT device (3), the PIN being used to set up the authenticated and encrypted third communication channel (KK3) running via the second server (2).

As another example, some embodiments include a computer program product that causes one or more of the methods as described herein to be performed on a program-controlled apparatus.

As another example, some embodiments include a system for onboarding an IoT device (3) of a manufacturer in an infrastructure of a customer, comprising a first server (1) of a manufacturer domain of the manufacturer and a second server (2) of a customer domain of the customer, the first server (1), the second server (2) and the IoT device (3) being set up to perform one or more of the methods as described herein.

BRIEF DESCRIPTION OF THE DRAWINGS

Further advantageous refinements and aspects of the teachings herein are the subject of the dependent claims and the exemplary embodiments that are described below. The teachings herein are explained in more detail below on the basis of preferred embodiments with reference to the attached figures.

DISCLOSURE

Figure 1:
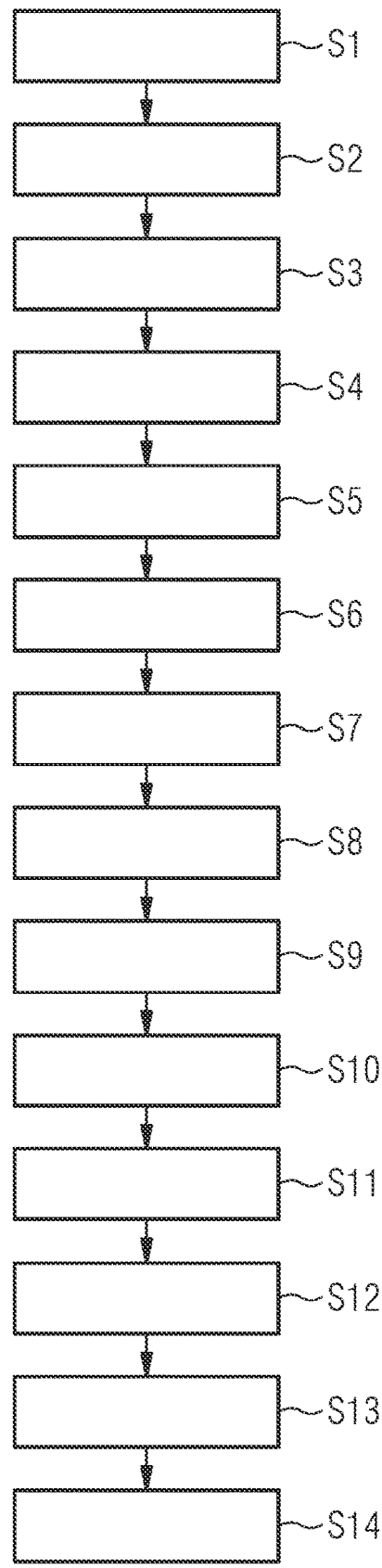
FIG. 1 shows a schematic flowchart for an exemplary embodiment of a method for onboarding an IoT device of a manufacturer in an infrastructure of a customer incorporating teachings of the present disclosure.

In the figures, identical or functionally identical elements have been provided with the same reference signs, unless indicated otherwise.

DETAILED DESCRIPTION

Some embodiments of the teachings herein include a method for onboarding an Internet of Things (IoT) device of a manufacturer in an infrastructure of a customer by means of a first server of a manufacturer domain of the manufacturer and a second server of a customer domain of the customer is proposed. As an example, some embodiments include a method comprising a KEM (Key Encapsulation Mechanism) method including:

a) setting up an authenticated and encrypted first communication channel between the first server and the second server, comprising deriving a first session key that is common to the first server and the second server, b) providing an authenticated and encrypted second communication channel between the IoT device and the second server, comprising deriving a second session key that is common to the second server and the IoT device, c) setting up an authenticated and encrypted third communication channel, which runs via the second server, between the IoT device and the first server, to which a third key that is common to the IoT device and the first server is assigned, d) forming permission information by way of the IoT device, e) cryptographically protecting the formed permission information by way of the IoT device by means of the third key, f) transmitting the cryptographically protected permission information from the IoT device to the second server via the second communication channel, g) transmitting the cryptographically protected permission information from the second server to the first server via the first communication channel, h) decrypting the cryptographically protected permission information transmitted from the second server to the first server by way of the first server by means of the third key, i) encrypting, and preferably providing integrity protection for, the decrypted permission information by way of the first server by means of the first session key, j) transmitting the, preferably integrity-protected, permission information encrypted with the first session key from the first server to the second server via the first communication channel, k) decrypting, and preferably checking the integrity of, the permission information encrypted with the first session key by way of the second server, l) sending a request to obtain a device certificate, associated with the IoT device, of the customer domain from the second server to a certificate authority, in particular of the customer domain, m) transmitting the obtained device certificate, and preferably configuration data of the customer domain, and the permission information decrypted by the second server from the second server to the IoT device via the second communication channel, and n) accepting the device certificate transmitted by the second server, and possibly configuration data of the customer domain, by way of the IoT device if the permission information transmitted by the second server matches the formed permission information.

As another example, some embodiments include a method for onboarding an IoT device of a manufacturer, in a manner secure against quantum computer attacks, in an infrastructure of a customer by means of a first server of a manufacturer domain of the manufacturer and a second server of a customer domain of the customer is thus provided, in which three authenticated and encrypted communication channels and a key encapsulation method are used to provide a device certificate of the customer domain for the IoT device on the IoT device.

In some embodiments, the onboarding is a zero touch device onboarding and thus an automated process, without a service engineer needing to intervene, in which the device certificate of the customer domain is transmitted to the IoT device and in particular is accepted and installed by the latter. Further configuration settings and/or credentials can be installed on the IoT device with or after the device certificate.

The KEM method may be referred to as a key encapsulation method (KEM (Key Encapsulation Mechanism) method). The various methods for onboarding can also be referred to as an onboarding method or device onboarding method or process. In contrast to conventional solutions in particular regarding signature methods, the example method essentially uses checking of certificate signatures. Increased protection against quantum computer attacks results from chiefly using KEM-based methods. In the present case, therefore, only signature checks take place as part of the certificate validations.

The teachings of the present disclosure may provide the technical advantage that no signature generation methods are needed outside the certificate authority (also called the certification authority). There is thus no need for secure management of private signature keys outside the certificate authority, since no private signature keys are needed and consequently a secure memory therefor is not necessary either. Furthermore, there is no need for an implementation of a signature generation method in the present case, since no signature generation methods are used in the present case. A smaller code base is thus achieved. Accordingly, should a signature generation method or the implementation of a signature generation method be affected by a future attack or bug, the methods described herein are not affected thereby. If there is an error during the performance of steps a) to n), the method may be aborted and restarted.

In some embodiments, the authenticated and encrypted first communication channel and/or the authenticated and encrypted second communication channel is cryptographically protected by means of a KEM method. The use of a KEM method for cryptographic protection may be useful in respect of the use of post-quantum methods and resistance to quantum computer attacks.

Using a KEM method can give rise to performance advantages, as KEM methods are often more performant than signature methods. In some embodiments, the onboarding method can be made secure against quantum computer attacks very easily by using post-quantum KEMs. Post-quantum KEMs are currently standardized by the US NIST (National Institute of Standards and Technology). The onboarding methods can therefore also be regarded as a post-quantum device onboarding process. In some embodiments, hybrid (pre-quantum and post-quantum) KEM methods can be used flexibly. The methods can therefore also be referred to as a hybrid pre-/post-quantum device onboarding process.

Following successful performance of step n), the IoT device is set up for communication within the customer domain, i.e. onboarding is successfully complete. The IoT device can optionally use the device certificate, in particular KEMTLS device certificate, that is in place to set up a KEMTLS connection to the second server. This allows the second server to verify that the onboarding of the IoT device is successfully complete.

The IoT device draws its confidence in the new domain, in the present case the customer domain, as a result of only the first server being capable of determining the permission information, for example in the form of a nonce (https://en.wikipedia.org/wiki/Cryptographic_nonce), and as a result of the respective checks and authentications and the protected communication channels, in the present case the first, second and third communication channels.

The second server draws its confidence in the IoT device by way of various checks and in particular by being able to validate the associated device certificate during channel setup, in particular KEMTLS channel setup, and being able to cross-check the identity information contained in said certificate, for example on the basis of an inventory list.

The first server can use authenticated key exchange to check whether the second server can demonstrate an encrypted character string, here the cryptographically protected permission information, from an authorized IoT device.

In some embodiments, the KEM method used is KEMTLS. KEMTLS is a communication protocol designed as an extension for TLS 1.3, and uses KEM-based methods instead of signature methods for authentication and for key exchange. KEMTLS, similarly to conventional TLS, results in an authenticated and encrypted communication channel being set up. Internally, however, different cryptographic primitives are used, i.e. KEM instead of a digital signature and instead of a conventional key exchange method.

In some embodiments, the authenticated and encrypted third communication channel is rendered as a direct communication channel between the IoT device and the first server.

In some embodiments, the authenticated and encrypted third communication channel is rendered as a tunnelled communication channel by tunnelling via the authenticated and encrypted first communication channel and the authenticated and encrypted second communication channel, the second server being used in particular as a forwarding instance in respect of steps f) and g).

In some embodiments, before step a) is performed, the first server is equipped with a root certificate of the manufacturer domain, a root certificate of the customer domain, a user certificate of the manufacturer domain for the first server, comprising a public key of the first server, and a private key of the first server. Before step a) is performed, the second server is preferably equipped with the root certificate of the manufacturer domain, the root certificate of the customer domain, a user certificate of the customer domain for the second server, comprising a public key of the second server in the customer domain, and with a private key of the second server. Before step b) is performed, the IoT device is preferably equipped with the root certificate of the manufacturer domain, with a user certificate of the manufacturer domain for the IoT device, comprising a public key of the IoT device in the manufacturer domain, and with a private key of the IoT device.

In some embodiments, the first session key is known to the first server and the second server and unknown to the IoT device. The second session key is preferably known to the second server and the IoT device and unknown to the first server. The third key is preferably known to the first server and the IoT device and unknown to the second server.

In some embodiments, step d) comprises a random number or a quasi-random number being formed by the IoT device as permission information. In some embodiments, the IoT device forms a nonce as permission information. The IoT device is the actuator and the location of formation of the nonce.

In some embodiments, step m) is rendered by: transmitting the obtained device certificate together with the permission information from the second server to the IoT device via the second communication channel within a single session, the permission information being transmitted from the second server to the IoT device via the second communication channel preferably as part of a certificate extension of the device certificate. In some embodiments, a hash value of the root certificate of the customer domain is transmitted from the first server to the IoT device. In particular, this hash value of the root certificate is encrypted together with the permission information on the basis of the public KEM key of the IoT device by the first server using the key encapsulation method and transferred to the IoT device as an extended component of the permission information.

In some embodiments, the second server sends a cryptographic hash value of the root certificate that it wishes to use for the IoT device to the first server. This hash value can be transferred back to the IoT device by the first server, in particular after a check has taken place, by virtue of said first server encrypting said hash value for the IoT device using a further shared secret and returning it to the second server, which transfers this message to the IoT device. The IoT device therefore has a further checking option for the root certificate of the customer domain.

In some embodiments, the cryptographically protected permission information transmitted in steps f) and g) is rendered as a KEM-protected protocol message.

In some embodiments, the authenticated and encrypted second communication channel is terminated or invalidated after step m).

In some embodiments, the IoT device takes the formed permission information as a basis for permitting only precisely one set of configuration data comprising the device certificate to be loaded In some embodiments, the first server, the second server and the IoT device are each equipped with a KEM-based protocol stack. In some embodiments, the KEM-based protocol stack of the IoT device is additionally equipped with suitability for Provisional Accept. In some embodiments, the KEM-based protocol stack is set up to implement KEMTLS or KEMTLS-PDK.

Provisional Accept is a mechanism from RFC 8995 that involves setting up a secure channel on a certificate basis, with the sole exception that the client, here the IoT device, permits a specific error during the first check on the server certificate. This error is the absence of a trusted root certificate, here the root certificate of the customer domain, in its store of trusted root certificates. Random communication is subsequently not permitted by the channel that has been set up in this way, but rather only a reduced sequence according to a linear machine (in this regard see the detailed description relating to FIG. 2). As soon as an error occurs during the described sequence or as soon as there is a departure from the described sequence, the communication channel is cleared down and the client, here the IoT device, changes to the state that it already had before the communication channel was set up (so-called rollback).

In some embodiments, following successful performance of step n), the IoT device resolves the Provisional Accept and transmits the device certificate, in particular a KEMTLS device certificate, to its persistent memory. In some embodiments, further certificates, in particular the certificate chain or the associated root certificate or other configuration settings and/or configuration information, can also be written to the persistent memory by the IoT device. The associated root certificate can be labelled as trusted.

In some embodiments, step c) is rendered by: setting up the authenticated and encrypted third communication channel, which runs via the second server, between the IoT device and the first server, comprising deriving a third session key that is common to the IoT device and the first server.

In some embodiments, before step c) is performed, a device-individual PIN (or PIN code) is securely stored in each of the first server and the IoT device. The PIN is used to set up the authenticated and encrypted third communication channel running via the second server.

In some embodiments, the permission information and the PIN are encrypted using the KEM method described above, that is to say directly form the secret protected by way of encapsulation. In this case, both KEM methods and PKE (Public Key Encryption) methods can be used. The PIN is stored confidentially both by the first server and within the IoT device. In some embodiments, the first server uses a master key method for deriving device-individual PINs, in order to minimize the volume of data that needs to be stored confidentially.

In some embodiments, a computer program product prompts the performance of one or more of the methods, as explained above, on a program-controlled apparatus. A computer program product, such as for example a computer program means, may be provided or delivered for example as a storage medium, such for example a memory card, USB stick, CD-ROM, DVD, or also in the form of a downloadable file from a server in a network. This may take place, for example, in a wireless communication network through the transmission of an appropriate file comprising the computer program product or the computer program means.

In some embodiments, a system for onboarding an IoT device of a manufacturer in an infrastructure of a customer comprises a first server of a manufacturer domain of the manufacturer and a second server of a customer domain of the customer, the first server, the second server and the IoT device being set up to perform the method according to the first aspect or one of the embodiments of the first aspect. The embodiments and features described for the described methods apply accordingly to the systems.

Further possible implementations of the teachings herein also include combinations of features or embodiments that have been described above or are described hereinafter with reference to the exemplary embodiments but have not been mentioned explicitly. In this case, a person skilled in the art will also add individual aspects as improvements or additions to the respective basic form of the teachings of the present disclosure.

FIG. 1 shows a schematic flowchart for an exemplary embodiment of a method for onboarding an IoT device 3 of a manufacturer in an infrastructure of a customer by means of a first server 1 of a manufacturer domain of the manufacturer and a second server 2 of a customer domain of the customer incorporating teachings of the present disclosure. The exemplary embodiment shown in FIG. 1 is explained with reference to FIG. 2. Apropos this, FIG. 2 shows a schematic communication chart for an exemplary embodiment of a system for onboarding the IoT device 3.

Figure 2:
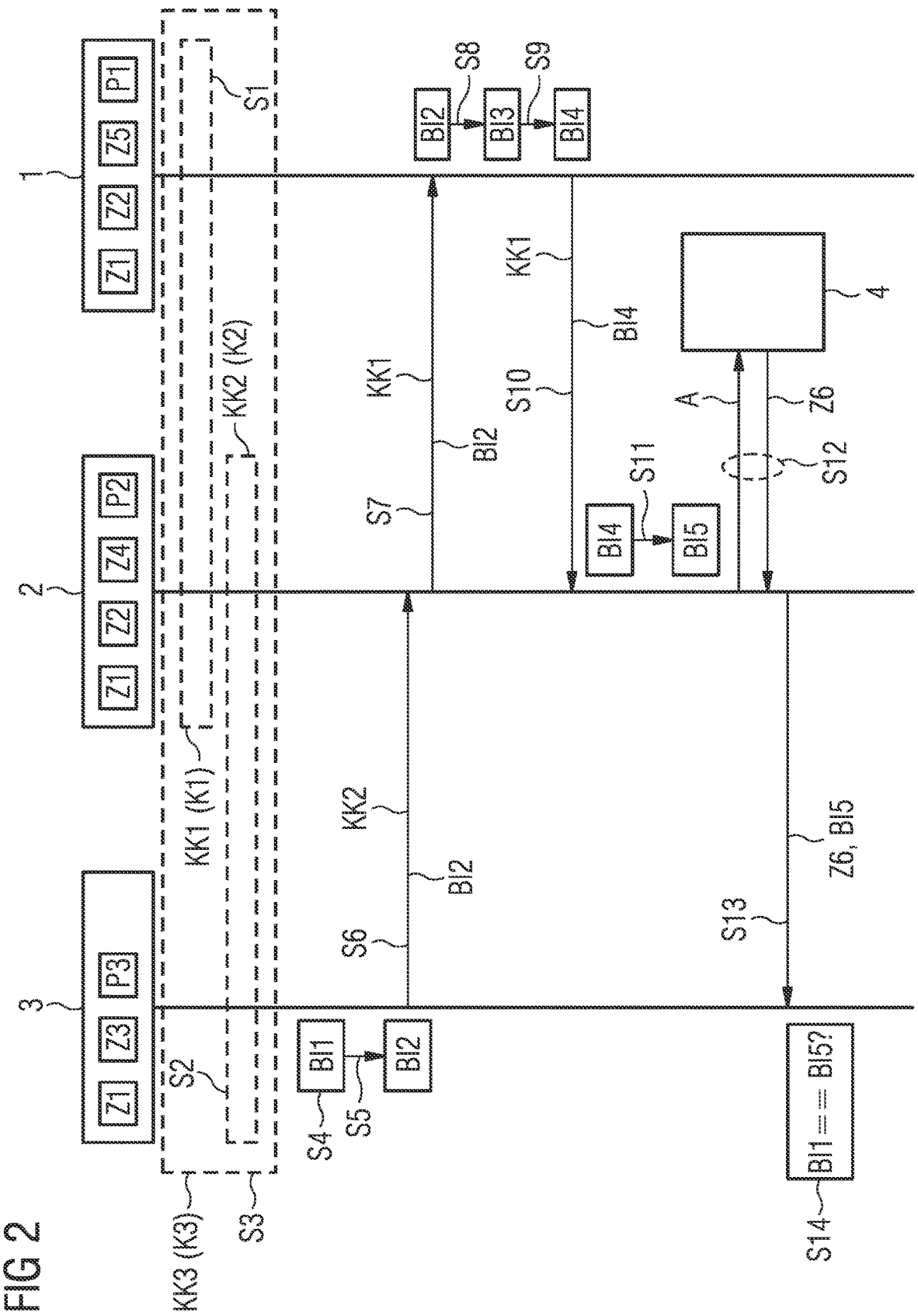
FIG. 2 shows a schematic communication chart for an exemplary embodiment of a system for onboarding an IoT device incorporating teachings of the present

The communication chart in FIG. 2 shows channel setup and communication between the first server 1, the second seven 2 and the IoT device 3. The method shown in FIG. 1 comprises steps S1 to S14. These steps S1 to S14 are also depicted in FIG. 2. Before steps S1 to S14 are performed, the first server 1 is equipped with a root certificate Z1 of the manufacturer domain, a root certificate Z2 of the customer domain, a user certificate Z5 of the manufacturer domain for the first server 1, comprising a public key of the first server 1, and a private key P1 of the first server 1. The second server 2 is equipped with the root certificate Z1 of the manufacturer domain, the root certificate Z2 of the customer domain, a user certificate Z4 of the customer domain for the second server 2, comprising a public key of the second server 2 in the customer domain, and with a private key P2 of the second server 2. The IoT device 3 is equipped with the root certificate Z1 of the manufacturer domain, with a user certificate Z3 of the manufacturer domain for the IoT device 3, comprising a public key of the IoT device 3 in the manufacturer domain, and with a private key P3 of the IoT device 3.

In particular, the first server 1, the second server 2 and the IoT device 3 are each equipped with a KEM-based protocol stack. Apropos this, the KEM-based protocol stack of the IoT device 3 is preferably additionally equipped with suitability for Provisional Accept. The KEM-based protocol stack is in particular set up to implement KEMTLS or KEMTLS-PDK and is used in particular for performing the method shown in FIGS. 1 and 2.

The sequence of method steps S1 to S14 shown in FIGS. 1 and 2 is described below. The steps are shown in an example order, but some embodiments may include less than all of these described elements and/or may include the various elements in a different order, or performed simultaneously.

In step S1, an authenticated and encrypted first communication channel KK1 is set up between the first server 1 and the second server 2. This setup comprises in particular deriving a session key K1 that is common to the first server 1 and the second server 2 (see FIG. 2).

In step S2, an authenticated and encrypted second communication channel KK2 is provided between the IoT device 3 and the second server 2. This provision comprises in particular deriving a second session key K2 that is common to the second server 2 and the IoT device 3 (see FIG. 2). The authenticated and encrypted first communication channel KK1 and/or the authenticated and encrypted second communication channel KK2 are cryptographically protected preferably by means of a KEM method. The KEM method used is KEMTLS, for example.

The first session key K1 is known in particular to the first server 1 and the second server 2, but unknown to the IoT device 3 (see K1 in FIG. 2). The second session key K2, on the other hand, is known to the second server 2 and the IoT device 3, but unknown to the first server 1 (in this regard see K2 in FIG. 2).

In step S3, an authenticated and encrypted third communication channel KK3, which runs via the second server 2, is set up between the IoT device 3 and the first server 1. The third communication channel KK3 has an associated third key K3 that is common to the IoT device 3 and the first server 1 (see K3 in FIG. 2). The third key K3 is known to the first server 1 and the IoT device 3, in particular unknown to the second server 2.

By way of example, the authenticated and encrypted third communication channel KK3 is rendered as a direct communication channel between the IoT device 3 and the first server 1. In some embodiments—and as shown in the example in FIG. 2—the third communication channel KK3 is rendered as a tunnelled communication channel by tunnelling via the authenticated and encrypted first communication channel KK1 and the authenticated and encrypted second communication channel KK2. Apropos this, the second server 2 is then used as a forwarding instance.

In some embodiments, the third key K3 can also be in the form of a session key K3. In this case, the step of setting up the authenticated and encrypted third communication channel KK3, which runs via the second server 2, between the IoT device 3 and the first server can comprise deriving a third session key K3 that is common to the IoT device 3 and the first server 1.

In step S4, permission information BI is formed by the IoT device 3. The IoT device 3 is the actuator and the location of formation of the permission information BI. In particular, a random number or a quasi-random number, for example a nonce, is formed by the IoT device 3 as permission information BI1.

In step S5, the formed permission information BI is cryptographically protected, in particular encrypted, by way of the IoT device 3 by means of the third key K3. Cryptographic protection comprises in particular integrity protection, authenticity and confidentiality.

In step S6, the cryptographically protected permission information BI2 is transmitted from the IoT device 3 to the second server 2 via the second communication channel KK2.

In step S7, the cryptographically protected permission information BI2 is transmitted from the second server 2 to the first server 1 via the first communication channel KK1. The cryptographically protected permission information BI2 transmitted in steps S6 and S7 is preferably in the form of a KEM-protected protocol message.

In step S8, the cryptographically protected permission information BI2 transmitted from the second server 2 to the first server 1 is decrypted by way of the first server 1 by means of the third key K3 in order to provide decrypted permission information BI3.

In the next step S9, the provided permission information BI3 is encrypted by way of the first server 1 by means of the first session key K1.

In step S10, the permission information BI4 encrypted with the first session key K1 is transmitted from the first server 1 to the second server 2 via the first communication channel KK1.

In step S11, the permission information BI4 encrypted with the first session key K1 is decrypted by way of the second server 2, with the result that decrypted permission information BI5 is available on the second server 2.

In step S12, the second server 2 sends a request A to obtain a device certificate Z6, associated with the IoT device 3, of the customer domain to a certificate authority 4, which is preferably associated with the customer domain.

After obtaining the device certificate Z6, the second server 2 transmits the device certificate Z6 and the permission information BI5 it has decrypted to the IoT device 3 via the second communication channel KK2. The device certificate Z6 obtained from the certificate authority 4, together with the permission information BI5, is preferably transmitted from the second server 2 to the IoT device 3 via the second communication channel KK2 within a single session, the permission information BI5 being transmitted preferably as part of a certificate extension of the device certificate Z6.

In some embodiments, a hash value of the root certificate Z2 of the customer domain is additionally transmitted from the first server 1 to the IoT device 3 in a cryptographically protected manner. The transmitted hash value of the root certificate Z2 can be used by the IoT device 3 for authenticating the second server 2. In some embodiments, the authenticated and encrypted second communication channel KK2 is terminated or invalidated after step S13.

In step S14, the device certificate Z6 transmitted by the second server 2 is accepted by way of the IoT device 3 if the permission information BI5 transmitted by the second server 2 matches the permission information BI1 formed on the IoT device 3 in step S4 and the root certificate Z2 of the customer domain permits resolution of the Provisional Accept. To this end, the IoT device 3 stores the permission information BI1 formed in step S4 in a storage unit of the IoT device 3.

In some embodiments, the IoT device 3 takes the formed permission information BI1 as a basis for permitting only precisely one set of configuration data, comprising the device certificate Z6, to be loaded. Thereafter, i.e. after step S14, the formed permission information BI1 is preferably invalidated.

Although the teachings of the present disclosure have been described on the basis of exemplary embodiments, it is able to be modified in many ways.

The invention claimed is:

1. A method for onboarding an Internet of Things (IoT) device of a manufacturer in an infrastructure of a customer using a first server of a manufacturer domain and a second server of a customer domain, the method comprising:
   a) setting up an authenticated and encrypted first communication channel between the first server and the second server, comprising deriving a session key common to the first server and the second server;
   b) providing an authenticated and encrypted second communication channel between the IoT device and the second server, comprising deriving a second session key common to the second server and the IoT device;
   c) setting up an authenticated and encrypted third communication channel running via the second server between the IoT device and the first server, and assigning a third key common to the IoT device and the first server;
   d) forming permission information using the IoT device;
   e) cryptographically protecting the formed permission information using the third key;
   f) transmitting the cryptographically protected permission information from the IoT device to the second server via the second communication channel;
   g) transmitting the cryptographically protected permission information from the second server to the first server via the first communication channel;
   h) decrypting the cryptographically protected permission information transmitted from the second server to the first server by way of the first server using the third key;
   i) encrypting the decrypted permission information using the first server and the first session key;
   j) transmitting the permission information encrypted with the first session key from the first server to the second server via the first communication channel;
   k) decrypting the permission information encrypted with the first session key using the second server;
   l) sending a request to obtain a device certificate associated with the IoT device of the customer domain from the second server to a certificate authority;
   m) transmitting the obtained device certificate and the permission information decrypted by the second server from the second server to the IoT device via the second communication channel; and
   n) accepting the device certificate transmitted by the second server using the IoT device if the permission information transmitted by the second server matches the formed permission information.

2. The method as claimed in claim 1, wherein the authenticated and encrypted first communication channel and/or the authenticated and encrypted second communication channel is cryptographically protected by means of a KEM method.

3. The method as claimed in claim 2, wherein the KEM method used comprises KEMTLS.

4. The method as claimed in claim 1, wherein:
   the authenticated and encrypted third communication channel is rendered as a direct communication channel between the IoT device and the first server; or
   the authenticated and encrypted third communication channel is rendered as a tunnelled communication channel by tunnelling via the authenticated and encrypted first communication channel and the authenticated and encrypted second communication channel.

5. The method as claimed in claim 1, wherein:
before a) is performed, the first server is equipped with a root certificate of the manufacturer domain, a root certificate of the customer domain, and a user certificate of the manufacturer domain for the first server, including a public key of the first server, and a private key of the first server;
before a) is performed, the second server is equipped with the root certificate of the manufacturer domain, the root certificate of the customer domain, a user certificate of the customer domain for the second server, including a public key of the second server in the customer domain, and with a private key of the second server; and
before b) is performed, the IoT device is equipped with the root certificate of the manufacturer domain, with a user certificate of the manufacturer domain for the IoT device, including a public key of the IoT device in the manufacturer domain, and with a private key of the IoT device.

6. The method as claimed in claim 1, wherein:
the first session key is known to the first server and the second server and is unknown to the IoT device;
the second session key is known to the second server and the IoT device and is unknown to the first server; and/or
the third session key is known to the first server and the IoT device and is unknown to the second server.

7. The method as claimed in claim 1, wherein d) comprises forming a random number or a quasi-random number by the IoT device as permission information.

8. The method as claimed in claim 1, wherein m) is rendered by transmitting the obtained device certificate together with the permission information from the second server to the IoT device via the second communication channel within a single session, the permission information being transmitted from the second server to the IoT device via the second communication channel as part of a certificate extension of the device certificate.

9. The method as claimed in claim 1, wherein the cryptographically protected permission information transmitted in f) and g) is rendered as a KEM-protected protocol message.

10. The method as claimed in claim 1, wherein the authenticated and encrypted second communication channel is terminated or invalidated after m).

11. The method as claimed in claim 1, wherein the IoT device uses the formed permission information as a basis for permitting precisely one set of configuration data comprising the device certificate to be loaded.

12. The method as claimed in claim 1, wherein the first server, the second server, and the IoT device are each equipped with a KEM-based protocol stack, the KEM-based protocol stack of the IoT device additionally equipped with suitability for Provisional Accept, and the KEM-based protocol stack being set up to implement KEMTLS or KEMTLS-PDK.

13. The method as claimed in claim 1, wherein c) is rendered by setting up the authenticated and encrypted third communication channel running via the second server between the IoT device and the first server, comprising deriving a third session key that is common to the IoT device and the first server.

14. The method as claimed in claim 1, wherein, before c) is performed, a device-individual PIN is securely stored in each of the first server and the IoT device, the PIN used to set up the authenticated and encrypted third communication channel running via the second server.

15. A system for onboarding an IoT device of a manufacturer in an infrastructure of a customer, the system comprising:
a first server of a manufacturer domain; and
a second server of a customer domain;
wherein the first server, the second server, and the IoT device are set up to perform the method as claimed in claim 1.

* * * * *